(12) United States Patent
Martin et al.

(10) Patent No.: US 6,832,832 B2
(45) Date of Patent: Dec. 21, 2004

(54) DYE SUBLIMATION INK-JET INK AND DYE SUBLIMATION TRANSFER PROCESS USING THE SAME

(75) Inventors: Thomas W. Martin, Rochester, NY (US); Michael J. McElligott, Rochester, NY (US); Donald E. Snyder, Jr., Spencerport, NY (US)

(73) Assignee: Nu-kote International, Inc., Franklin, TN (US)

( * ) Notice: Subject to any disclaimer, the term of this patent is extended or adjusted under 35 U.S.C. 154(b) by 129 days.

(21) Appl. No.: 10/234,770

(22) Filed: Sep. 4, 2002

(65) Prior Publication Data

US 2004/0041894 A1 Mar. 4, 2004

(51) Int. Cl.[7] ................................................. B41J 2/01
(52) U.S. Cl. ...................... 347/103; 347/101; 347/100; 347/105
(58) Field of Search ................................ 347/105, 101, 347/102, 100, 103, 95; 428/195, 32.1; 106/31.13, 31.27, 31.6

(56) References Cited

U.S. PATENT DOCUMENTS

| | | | |
|---|---|---|---|
| 4,614,521 A | | 9/1986 | Niwa et al. |
| 4,650,494 A | * | 3/1987 | Kutsukake et al. ...... 428/195.1 |
| 4,758,952 A | | 7/1988 | Harris, Jr. et al. |
| 4,816,435 A | * | 3/1989 | Murata et al. ............... 347/217 |
| 5,487,614 A | | 1/1996 | Hale |
| 6,074,440 A | * | 6/2000 | Onishi et al. .................. 8/638 |
| 6,341,856 B1 | | 1/2002 | Thompson et al. |

* cited by examiner

Primary Examiner—Stephen D. Meier
Assistant Examiner—Manish Shah
(74) Attorney, Agent, or Firm—Fay, Sharpe, Fagan, Minnich & McKee, LLP

(57) ABSTRACT

The invention relates to an ink-jet ink composition suitable for use in secondary transfer processes wherein the ink-jet ink composition contains a pre-dispersion containing at least a sublimation colorant combined with an ink-jet ink containing at least a non-sublimable colorant. Upon printing, a monochrome intermediate transfer substrate is created. From this monochrome substrate, a multi-color image can be transferred to a permanent substrate with the application of heat and pressure. The monochrome intermediate transfer image is created by the non-sublimable colorant upon printing. The multi-color permanent image is generated as elevated temperatures and pressure of the transfer process cause the sublimation colorant to sublime and bond to the permanent substrate.

20 Claims, No Drawings

DYE SUBLIMATION INK-JET INK AND DYE SUBLIMATION TRANSFER PROCESS USING THE SAME

The invention relates to an ink-jet ink containing a sublimation dye component in conjunction with an additional non-sublimation colorant, and further to the use thereof in a process for preparing a dye sublimation ink-jet ink transfer intended for use in secondary transfer operations or processes.

BACKGROUND

There is a large market for transfer printing. By "transfer printing" is meant the transfer of an image, whether in the form of a photograph, a computer generated picture or a graphic design, words, such as a company logo or a particular saying, or other type of printed matter. Generally, transfer printing involves producing a transfer sheet or substrate bearing the image to be transferred, and subsequently transferring the image from the transfer sheet or substrate to a permanent substrate upon which the image is to permanently appear. The permanent substrate may be any type of material which will accept and retain the transferred image, including but not limited to fabric, including natural fiber materials, synthetic materials, and combinations thereof, wood, glass, ceramic, metal, and other such substrates. Most often, transfer printing is used to generate such items as t-shirts, coffee mugs, mouse pads, and other such items. The process may also be used to print security-type items, such as identity badges.

Prior art technology provides for printing a full color image, usually in the reverse format, on a transfer sheet. This allows the user to view the final image, even if in reverse format, and even though the colors may be to some extent dull. Having the permanent image visible on the transfer or intermediate substrate may not be desirable in those instances where security is an issue, such as in the printing of identity badges or other security-type information.

Known transfer processes employ inks containing sublimable or diffusion-type dyes, sometimes called "heat activated" dyes or colorants. These dyes are well suited to the transfer industry due to the fact that they activate or diffuse only at elevated temperatures, in the range of about 300° C. to 450° C. Therefore, the operational temperature of most printers will not activate the dye, and the dye merely prints onto the transfer substrate but is not permanently bound thereto. A subsequent application of heat and/or pressure is used to "transfer" the dye previously printed in the desired image on the transfer substrate, to the permanent substrate, i.e., a combination of elevated temperature and pressure cause the dye to activate and diffuse into the permanent substrate surface where it permanently bonds. The temperature and pressure parameters are dictated by the sublimation dye used, by any additional components in the ink which interfere with or inhibit the diffusion of the sublimation dye, and by the substrate itself upon which the final image is formed.

Prior technology used ribbons to carry the sublimation dye-containing inks. More recent printers require the use of liquid inks. With either print set-up, the printed transfer substrate, or intermediate substrate, is printed such that the image to be transferred is visible and substantially consistent with the permanent transferred image.

Inkjet printers using liquid inks are usually fitted with stations to accept color or color and black cartridges. The color cartridges may jet cyan, magenta, and yellow ink droplets. The black cartridge jets black ink droplets. Full color images are printed by jetting combinations of the color inks (referred to as subtractive primary colors). For example, red is printed with a combination of magenta and yellow inks; green is printed with a combination of cyan and yellow inks; and blue is printed with a combination of cyan and magenta inks. Virtually any color may be printed by printing appropriate amounts of the subtractive primary colors. Black is generally printed with a combination of the three colors. The black cartridge is used to print text and to add black density to the shadows in full color printed images. This type of processing, when used to create transfer sheets, can only generate an intermediate image which is visually the same with regard to color as the final image once transferred. Generally, a computer program is required to print the intermediate image in the reverse of the final image, so that upon transfer the image is appropriately situated. This, however, is unacceptable in those instances, such as in the printing of security items, where there is a need for the permanent image to be revealed only on the permanent substrate.

Therefore, there exists a need in the industry for a means to print an intermediate transfer substrate that does not reveal the image to be transferred to the permanent substrate prior to the transfer.

SUMMARY OF THE INVENTION

It is an object of the invention to provide an ink-jet ink suitable for use in current inkjet printers and which prints a monochrome intermediate transfer substrate which may subsequently be used to transfer a multi-color image to a permanent substrate.

It is another object of the invention to provide an ink-jet ink composition which contains a first sublimation-type colorant and a second non-sublimation type colorant, wherein the second non-sublimation type colorant functions to mask on a printed intermediate substrate the full color image which is to be ultimately rendered on a permanent substrate.

It is yet another object of the invention to provide an ink-jet ink composition suitable for use in generating an intermediate substrate which may be used to render a full color image on a secondary or permanent substrate, wherein the ink-jet ink composition comprises a first sublimable colorant and a second non-sublimable colorant, and wherein the second non-sublimable colorant is a colorant capable of absorbing and retaining heat generated during printing of the intermediate substrate, thus lowering the amount of heat necessary to affect sublimation of the first sublimable colorant upon transfer to the permanent substrate.

It is still another object of the invention to provide a process for printing a monochrome intermediate substrate which may subsequently be used to render a full color image on a permanent substrate.

It is another object of the invention to provide a process for printing a monochrome intermediate substrate which may subsequently be used to render a full color image on a permanent substrate wherein the process includes the use of an ink-jet ink composition which comprises at least a first sublimable colorant and a second non-sublimable colorant and wherein the full color image rendered on the permanent substrate is transferred from a monochrome intermediate substrate at a temperature lower than the normal sublimation temperature of the first sublimation colorant.

DETAILED DESCRIPTION OF THE INVENTION

The invention relates to the use of an ink-jet ink containing a combination of sublimable and non-sublimable colorants to generate a printed transfer medium. The medium may then be used to transfer an image printed on the medium to a permanent substrate. The combination of colorants used in the ink creates a printed transfer medium which has a monochrome appearance. However, upon transfer of the image from the medium to a permanent substrate a full color image is created. In essence, the non-sublimable colorant acts as a masking agent, preventing the image printed on the medium from being fully recognizable. This is an advantage in those instances where security considerations must be taken into account when preparing the transfer medium. Of course, the ink-jet ink disclosed herein may also be used in those instances where security issues are not critical.

The ink-jet ink is a dye-sublimation ink comprising a sublimation or heat activated dye component. Generally, this first sublimation dye component may be any dye or colorant that is activated, or caused to diffuse or sublimate, at an elevated temperature, in excess of the operational temperature of the print engine, generally of at least about 300° C. Hereafter, use of the term "sublimation" or "heat activated" dye or colorant shall refer to all such colorants. In addition to the first sublimation colorant, the ink-jet ink further includes a second colorant which is not a sublimation colorant. This second non-sublimable colorant may be a dye or pigment, and need only meet the requirement that it print readily on the intermediate or transfer substrate and that it not transfer to the permanent substrate upon application of elevated temperature and pressure necessary to activate or sublime the sublimation colorant.

The remaining ink-jet ink components include dispersing agents, humectants, solvents, biocides, surfactants, complexing agents, and other such components generally known in the art of ink-jet inks. Of course, the ink may contain one or more of any one of these known additive components.

The intermediate substrate or transfer sheet may comprise any material that can be printed upon by the desired printer. In addition, it is preferable that the sublimation dye component not have a particular affinity for the transfer medium. Generally, the transfer medium is a type of paper, but any material suited to the purpose may be used.

The permanent substrate may be any type of material upon which it is desirable to affix a permanent image. Common substrates include fabric, such as T-shirts, jackets, sweatshirts, shorts, pants, hats, etc., and ceramics, such as coffee mugs, glasses, plates, etc. More recently, office items have become popular substrates, i.e., mouse pads, plaques, recognition/achievement items, etc. Of course, transfer may also be made to metal, wood, and any other substrate that will accept and retain the sublimation colorant, whether alone or with the aid of a binding compound or material.

The ink-jet ink that is the subject hereof is formulated in the form of a liquid. Preferably the ink-jet ink is an aqueous ink. The ink may further include an agent or agents that aid in maintaining the first and second colorants in suspension within the ink over extended periods of time. For example, liquid ink-jet ink compositions may sit in a printer for several weeks or even months, and may further be stored prior to being loaded into the printer. During this storage time, it is necessary that the colorants included in the ink-jet ink are maintained in solution or suspension. Depending on the colorants used, there may further be a need for a dispersing agent. Some colorants that can be used in this type of ink are not readily soluble in the aqueous solvent and therefore require the assistance of a dispersing agent to maintain the colorant in homogeneous mixture with the remaining ink-jet ink components.

The colorants suited for use in the ink-jet ink include at least two different types of colorants. A first type of colorant for use in the ink-jet ink is a colorant commonly known and referred to in the art as a heat activated or sublimation colorant. This colorant is activated or sublimated at a temperature in excess of about 300° C., which is generally above the operation temperature of the printer used to generate the printed medium or transfer. This type of colorant, therefore, is well suited for use in creating transfer mediums. The sublimation colorant is printed onto the intermediate substrate by the printer, but is not activated or sublimated. Therefore, it does not permanently bind to the intermediate substrate. Upon the subsequent application of heat and contact pressure the sublimation-type colorant is activated or sublimated, and transfers from the intermediate substrate to a permanent substrate. After transfer, the sublimated colorant is bound to the permanent substrate.

The second type of colorant used in the ink-jet ink is a non-sublimable colorant. This colorant may be any dye or pigment that does not require the application of elevated temperatures and/or pressure to activate, diffuse or liquefy the colorant. This second colorant transfers to the intermediate substrate and is bound thereto during the printing process used to generate the intermediate transfer. Suitable non-sublimable colorants include any dye or pigment which meets the above criteria with regard to sublimation or activation. For example, any known non-sublimable CI dye or pigment may be used. Additionally, the pigments used may include such pigments as carbon black. In that instance where security issues must be taken into consideration, it is contemplated that a black or dark colored dye or pigment would be best suited for use as it is more likely to completely mask the full color image which will be transferred in full color to the permanent substrate. Nonetheless, any color dye or pigment may be used as the second colorant.

The ink-jet ink may further contain an aqueous solvent system, which may comprise water, or water and at least one other co-solvent. These co-solvents may also function as humectants. The co-solvent may be selected from those co-solvents known in the art for use in formulating inkjet inks. Such co-solvents include alcohols, alkoxylated alcohols, monoalcohols, diols, triols, and polyols, diamine, triamines, glycerol, pyrrolidones, glycols, and other known co-solvents. Examples of such co-solvents include diethylene glycol, triethylene glycol, pyrrolidone, 2-pyrrolidone, 1,5-pentanediol, and others. The aqueous component is preferably de-ionized or distilled water.

Other additives may also be included in the ink-jet ink formulation. Such additives may include but are not limited to surfactants, defoaming agents, buffering agents, biocides, anti-oxidants, and others. These components are generally known in the art and may be included in the formulation by any known process for the addition of such components.

In formulating the ink-jet ink, it may be advantageous to first prepare a dispersion of the first coloring material and the aqueous solvent. In that instance where the colorant is provided as a powder, or even if the first colorant is provided in solution, it is necessary to ensure that the particle size of any solid colorant is smaller than the diameter of the print head orifice to eliminate potential problems stemming from clogging of the orifices. The sublimation colorant may first be homogeneously dispersed in an aqueous solvent. A dispersion aid may also be used. It has been found that suitable dispersing aids include for example surfactants such as the Surfynol products marketed commercially by Air Products, Tamol products by Rohm & Haas, abd Byk products by Byk-Chemie, among others. This dispersion may then be treated to reduce the particle size, for example by grinding or other mechanical means.

Alternatively, the sublimation colorant dispersion may be purchased. Commercially available dispersions that may suitably be used include such dispersions as the Intratherm dispersions (for example Intratherm Blue P-1305 Intratherm Brilliant Red P-1314, Intratherm Yellow P-1343) marketed by Sensient, dispersions available from Organic Dyestuffs Corporation (for example Orco Transfer Blue 2R, Orco Transfer Scarlet B, Orco Transfer Yellow 3G), and various color dispersions marketed by ECS Specialty Ink & Dyes, Ltd. (for example Subli Blue 770, Subli Red 770, Subli Yellow 781, Subli Black 774). The foregoing dispersions are exemplary of the type of sublimation colorant dispersion that can be used to formulate a dye-sublimation ink-jet ink that will print in monochrome and transfer in full color.

The colorant dispersion, whether originally prepared or commercially purchased, is combined with an ink-jet ink formulation suitable for use in an ink-jet printer. For example, the colorant dispersion may be added to an ink-jet ink formulation which includes at least one solvent and the second non-sublimable colorant as earlier described. The ink-jet ink may further contain any of the additives referred to previously herein. The final ink-jet ink formulation may contain from about 5% to about 50% of the sublimation colorant dispersion, based on the weight percent of the total ink-jet ink composition. Preferably, the ink-jet ink may contain from about 15% to about 40% of the sublimation colorant dispersion. The following sets forth a suitable ink-jet ink general formula in keeping with the invention.

| Ink-Jet Ink | |
|---|---|
| Component | Weight % |
| Distilled Water | 40%–85% |
| Co-Solvent | 0%–25% |
| Humectant | 5%–25% |
| Non-Sublimation Colorant | 10%–40% |
| Biocide | 0%–5% |
| Surfactant | 0%–20% |
| Complexing Agent | 0%–5% |
| Buffering Agent | 0%–5% |
| Sublimation Colorant Dispersion | 5%–50% |

The following example sets forth a method which may be used to prepare an inkjet ink formulation in keeping with the foregoing disclosure. It is not intended to in any way limit the scope of the invention, and may be modified by the skilled artisan in keeping with known ink formulating techniques without deviating from the invention contemplated herein.

EXAMPLE 1

In this embodiment an ink-jet ink which is suitable for use in printing a monochrome transfer substrate that can be subsequently used to transfer from the monochrome image, with the application of heat and pressure, an image in full color on a permanent substrate, was prepared. Initially, an ink dispersion which comprised at least a first sublimable colorant and a solvent was prepared. The dispersion further contained a surfactant. While the following dispersion included only one such colorant, multiple colorants could be used to achieve a desired color. Further, colorants could be combined to create still other hues and shades, for example a cyan and magenta colorant could be combined in a single given dispersion if desired. this dispersion was prepared by first combining the Surfynol CT 324 dispersing aid with distilled water. To this was added Crompton & Knowles dry powder CT Yellow P343 sublimation colorant. The components as combined were subjected to milling for a period of 11 days, and then a suitable dispersion was recovered.

| Yellow Dispersion 1 | |
|---|---|
| Distilled Water | 75% |
| Surfynol 324CT | 5% |
| CK Yellow P343 | 20% |

This dispersion was then combined with an ink-jet ink formulation, as set forth below, to prepare an ink suitable for use in an ink-jet printer. the Cab-O-Jet 300 pigment is the second non-sublimable colorant as defined in the invention.

| Yellow Ink-1a | |
|---|---|
| Distilled Water | 18.0% |
| 2-Pyrrolidone | 18.7% |
| 1,5-Pentanediol | 3.3% |
| Cab-O-Jet 300 | 20.0% |
| Yellow Dispersion 1 | 40.0% |

The same process was used to prepare magenta and cyan sublimation colorant dispersions as set forth in the following Table. The Magenta Ink-1a included a sublimation colorant dispersion formulated from water, CK Red P1339 and Surfynol CT 324, and the Cyan Ink-1a included water, Surfynol CT 324 and CK Blue NT 1305. These dispersions were combined with ink-jet ink formulations consistent with that set forth with regard to the Yellow Ink-1a, to create ink-jet inks according to the invention.

| Dispersion | Cyan 1 | Magenta 1 |
|---|---|---|
| Distilled Water | 75.0% | 75.0% |
| Surfynol CT 324 | 5.0% | 5.0% |
| CK Red P 1339 | | 20.0% |
| CK Blue NT 1305 | 20.0% | |

| Ink-Jet Ink | Cyan Ink-1a | Magenta Ink-1a |
|---|---|---|
| Distilled Water | 18.0% | 18.0% |
| 2-Pyrrolidone | 18.7% | 18.7% |
| 1,5 Pentanediol | 3.3% | 3.3% |
| Cab-O-Jet 300 | 20.0% | 20.0% |
| Cyan Dispersion 1 | 40.0% | |
| Magenta Dispersion 1 | | 40.0% |

All three inks, yellow, magenta and cyan, were loaded into the appropriate cartridges of an Epson 980 printer and a monochrome intermediate transfer was printed on Accuplot paper. The intermediate transfer image appeared as a black or gray scale image. the intermediate transfer substrate bearing the monochrome image was then placed in contact with a permanent substrate material, in this instance a license plate, and elevated heat (400° C.) and pressure were applied for less than 150 seconds. Upon removal of the transfer sheet from the license plate, a full color image of good quality was visible thereon. No residual from the nonsublimable colorant transferred to the permanent substrate.

EXAMPLE 2

In another preferred embodiment, commercially available sublimation colorant dispersions (Subli Yellow 781, Subli Blue 770, Subli Red 770, and Subli black 774) were combined with ink-jet ink components consistent with those set forth in Example 1 to create 4 dye sublimation ink-jet inks. These inks, i.e., yellow, cyan, magenta and black, were loaded into the corresponding cartridges of an Epson 980 printer and a black/gray scale monochrome intermediate substrate was printed. This intermediate substrate was then placed in contact with a permanent substrate and elevated heat and pressure were applied in the same manner as in Example 1. A full color image, exhibiting good color saturation and image quality, was rendered on the permanent substrate from the monochrome intermediate transfer substrate. It is noted that the degree of masking achieved on the intermediate substrate is a function of the amount of second, non-sublimation colorant employed and printed.

EXAMPLE 3

In yet another preferred embodiment, cyan, magenta, yellow, and black dye-sublimation ink-jet inks, as set forth generally below, were prepared in accord with the processing set forth in Examples 1 and 2. While these color inks were formulate using Subli Dispersions, other commercially available dispersions, such as the Intratherm line, as used in the black ink, may be used with equal success.

Cyan Ink-3a

| Component | Amount |
| --- | --- |
| Distilled water | Balance |
| Diethylene glycol | 9.0% |
| DEGMBE | 7.0% |
| Urea | 2.5% |
| Surfynol 465 | 1.0% |
| Subli Blue 770 Dispersion | 16.0% |
| Special Black HF Liquid | 20.0% |

Magenta Ink-3a

| Component | Amount |
| --- | --- |
| Distilled water | Balance |
| 1,5-Pentanediol | 3.0% |
| Glycerol | 9.0% |
| Urea | 1.5% |
| Surfynol 465 | 1.0% |
| Subli Red 770 Dispersion | 9.6% |
| Special Black HF Liquid | 20.0% |

Yellow Ink-3a

| Component | Amount |
| --- | --- |
| Distilled water | Balance |
| DEGMBE | 9.0% |
| Glycerol | 5.0% |
| Urea | 1.5% |

-continued

Yellow Ink-3a

| Component | Amount |
| --- | --- |
| Surfynol 465 | 1.0% |
| Subli Yellow 781 Dispersion | 8.0% |
| Special Black HF Liquid | 20.0% |

Black Ink-3a

| Component | Amount |
| --- | --- |
| Distilled water | Balance |
| Diethylene glycol | 6.0% |
| Glycerol | 6.0% |
| Urea | 3.0% |
| Surfynol 465 | 1.0% |
| Color or Black Dispersion(s)* | 14.7% |
| Special Black HF Liquid | 10.0% |

*Intratherm Dispersion comprising 10% Blue P1305, 3.3% Brilliant Red P1314, and 1.4% Yellow P1343

These inks were loaded into the corresponding color cartridges of an Epson 980 printer and printing was conducted. All nozzles and ink channels functioned efficiently within 2 priming cycles to generate monochrome intermediate printed transfer substrates. The printer was then allowed to rest, first over night and then for a period of several days. In the former instance, upon restart all nozzles fired efficiently with 1 clean cycle. In the latter instance, the nozzles fired efficiently with 3 clean cycles. In this same manner, Cyan Ink-1a, Magenta Ink-1a, and Yellow Ink-1a were tested. These inks, set forth in Example 1, included sublimation colorant dispersions prepared in-house. The test results show firing data consistent with the tests of inks including commercially available dispersions as stated immediately above.

The dye sublimation ink-jet ink may be formulated in accord with known processing and formulating methods. Alternatively, the ink may be prepared in accord with the processing and methods set forth below. While an ink formulated without this processing will demonstrate good print quality and operational performance, use of any or all of the processing parameters set forth hereafter will further enhance the ink and the performance thereof.

As was shown above in Example 1, the dye sublimation ink-jet ink maybe formulated by first preparing a dispersion which can subsequently be used to formulate the dye sublimation inkjet ink. This dispersion may include at least one sublimation colorant in conjunction with an aqueous medium and if necessary a dispersant for the colorant. Once this dispersion has been prepared, particular grinding techniques may be used to reduce the size of the sublimation colorant particles, and to reduce particle agglomeration so that the particles can freely pass through the very small orifice openings characteristic of ink-jet print heads. There are several alternative means suitable for decreasing the particle size of the particulate matter in the ink dispersion. One method that may be used to reduce particle size is the use of conventional grinding techniques, such as ball milling. Other milling or grinding techniques include but are not limited to attritor grinding, cyclomill grinding and sand milling. This type of technique is time dependent, i.e., the longer the dispersion is subjected to the grinding process the smaller the particle size that can be achieved. A second method that is suitable for use in decreasing particle size in the dispersion is the use of non-conventional grinding methods such as microfluidizing and others combined with and employed as a post-grinding scheme after the use of conventional grinding means. Additionally, a step-down filtration method may be employed to achieve the desired small particle size.

Once the dispersion has been prepared, the dispersion maybe incorporated into an ink composition suitable for use in ink-jet printing equipment. The precise formulation for the ink is dependent to some degree on the type of print engine the ink will be used in, i.e., drop-on-demand or continuous, but in general the ink-jet ink will include some or all of the conventional ink-jet ink components. Among these components are colorants, humectants, dye or pigment stabilizers, surfactants, buffering agents, biocides, and water-soluble resins, to name a few. This list is not intended to be limitative of the components that may be used to formulate the ink-j et ink, but rather is intended to exemplify some of the components that may be needed to properly formulate the final ink-jet ink.

While in the foregoing Example a black pigment was used as the second non-sublimation colorant, it is to be understood that any non-sublimable pigment or non-sublimable dye suitable for use in inkjet ink compositions may be used. The result would be the printing of the intermediate image in only the color or colors of the second non-sublimable pigment or dye colorant(s). Upon transfer from the intermediate substrate to a permanent substrate, a full color image, in the colors of the sublimation dyes used in the ink formulation, would be rendered.

What we claim is:

1. An ink-jet ink for use in preparing a monochrome transfer medium comprising an aqueous pre-dispersion homogeneously combined with an ink-jet ink composition, said aqueous pre-dispersion comprising at least an aqueous carrier and at least one sublimation colorant and said ink-jet ink composition comprising a liquid carrier and at least one non-sublimable colorant, said pre-dispersion and said ink-jet ink compositions being combined in an amount sufficient to produce a monochrome image upon printing of said monochrome transfer medium, said monochrome image masking the image created upon printing by the sublimation colorant.

2. The ink-jet ink as in claim 1 wherein said aqueous pre-dispersion further includes a dispersing aid.

3. The ink-jet ink as in claim 2 wherein said dispersing aid is a surfactant.

4. The ink-jet ink of claim 1 wherein said non-sublimable colorant in said ink-jet ink composition is a pigment.

5. The ink-jet ink of claim 1 wherein said non-sublimable colorant in said ink-jet ink composition is carbon black.

6. The ink-jet ink of claim 1 wherein the monochrome transfer medium appears black.

7. A process for preparing a monochrome intermediate transfer medium comprising:
   a. preparing an ink-jet ink pre-dispersion comprising an aqueous carrier liquid, at least one surfactant, and at least one sublimation colorant;
   b. combining said ink-jet ink pre-dispersion with an ink composition comprising an aqueous carrier and at least one non-sublimable colorant to form an ink-jet ink;
   c. supplying said ink-jet ink to a printer; and
   d. operating said printer to print a monochrome image on said intermediate transfer medium, at a temperature below that at which said sublimation colorant sublimes, using said ink-jet ink including said at least one sublimation colorant and said at least one non-sublimable colorant.

8. The process of claim 7 wherein the monochrome image is printed in black so as to mask the image created when the sublimation colorant of said pre-dispersion is printed on said intermediate substrate without activating said sublimation colorant.

9. The process of claim 7 wherein the monochrome printed image is a color other than black.

10. The process of claim 7 further including the step of using said monochrome intermediate substrate to transfer a multi-color image to a permanent substrate with the application of pressure and heat.

11. A process for transferring a multi color image to a secondary substrate from a monochrome intermediate transfer medium comprising:
   a. preparing at least two ink-jet ink pre-dispersions, in different colors, each said pre-dispersion comprising an aqueous carrier liquid, at least one surfactant, and at least one sublimation colorant of a color different from the colorant in the remaining of said at least two ink-jet ink pre-dispersions;
   b. combining each said ink-jet ink pre-dispersion with an ink-jet ink composition comprising an aqueous carrier and at least one non-sublimable colorant to form an ink-jet ink formulation;
   c. supplying said ink-jet ink formulation to a printer,
   d. printing a monochrome image on an intermediate transfer substrate at a temperature below that at which said sublimation colorants sublime;
   e placing said monochrome image on said intermediate transfer substrate against a permanent substrate material; and
   f applying sufficient heat and contact pressure to said intermediate transfer substrate to cause said sublimation colorants to sublime and bond to said permanent substrate to render a multi color image on said permanent substrate from said monochrome image, wherein said non-sublimable colorant on said intermediate transfer substrate remains on said intermediate transfer substrate.

12. The process of claim 11 wherein one pre-dispersion is prepared in each of cyan, magenta and yellow, and wherein said multi color image is a full color image.

13. The process of claim 12 wherein said non-sublimable colorant is carbon black and said monochrome image appears black.

14. The process of claim 11 wherein the sublimation colorants sublime at a temperature above 300° C.

15. The process of claim 11 wherein said pressure is applied for less than 480 seconds.

16. A process for transferring a multi color image to a secondary substrate from a monochrome intermediate transfer medium comprising:
   a. obtaining at least two sublimation colorant-containing dispersions, in different colors;
   b. combining each said sublimation ink dispersion with an ink-jet ink composition comprising an aqueous carrier and at least one non-sublimable colorant to form an ink-jet ink formulation;
   c. supplying said ink-jet ink formulation to a printer,
   d. printing a monochrome image on an intermediate transfer substrate at a temperature below that at which said sublimation colorants sublime; and e transferring said monochrome image on said intermediate transfer substrate to said permanent substrate to render a multi color image on said permanent substrate from said monochrome image by applying sufficient pressure and heat to said substrate to cause said sublimation colorants to sublime.

17. The process of claim 16 wherein one said sublimation colorant dispersion is cyan, another said sublimation colorant dispersion is magenta and another said sublimation colorant dispersion is yellow, and wherein said multi color image is a full color image.

18. The process of claim 16 wherein said non-sublimable colorant is carbon black and said monochrome image appears black.

19. The process of claim 16 wherein the sublimation colorants sublime at a temperature above 300° C.

20. The process of claim 16 wherein said pressure is applied for less than 480 seconds.

* * * * *